United States Patent
Davies

(10) Patent No.: US 6,754,750 B2
(45) Date of Patent: Jun. 22, 2004

(54) METHOD FOR AUTOMATICALLY DETECTING AND CORRECTING DUPLICATE CONTROLLER SCSI IDS

(75) Inventor: Ian R. Davies, Longmont, CO (US)

(73) Assignee: Chaparral Network Storage Inc., Longmont, CO (US)

( * ) Notice: Subject to any disclaimer, the term of this patent is extended or adjusted under 35 U.S.C. 154(b) by 586 days.

(21) Appl. No.: 09/861,308

(22) Filed: May 17, 2001

(65) Prior Publication Data

US 2002/0174377 A1 Nov. 21, 2002

(51) Int. Cl.[7] .............................. G06F 13/00; G06F 3/00
(52) U.S. Cl. .............................. 710/104; 710/9; 710/74; 710/10; 713/100
(58) Field of Search .............................. 710/8–19, 104, 710/62–74, 300–304; 713/1, 2, 100

(56) References Cited

U.S. PATENT DOCUMENTS

| 4,730,251 A | * | 3/1988 | Aakre et al. ................. 710/104 |
| 5,544,333 A | * | 8/1996 | Frazier et al. ............... 710/124 |
| 5,781,796 A | * | 7/1998 | Lee ................................ 710/8 |
| 5,892,929 A | * | 4/1999 | Welker ......................... 710/107 |
| 5,903,778 A | * | 5/1999 | Chang ........................... 710/62 |
| 6,085,333 A |   | 7/2000 | DeKoning et al. ............. 714/7 |

* cited by examiner

Primary Examiner—Sumati Lefkowitz
(74) Attorney, Agent, or Firm—Sheridan Ross P.C.

(57) ABSTRACT

The methodology of the present invention automatically selects an unused id for a system component in a system where multiple other components with other ids are already present. In this manner, id conflicts are avoided.

32 Claims, 4 Drawing Sheets

METHOD FOR AUTOMATICALLY DETECTING AND CORRECTING DUPLICATE CONTROLLER SCSI IDS

FIELD OF THE INVENTION

The present invention is directed generally to multi-controller computational systems and specifically to multi-controller computational data storage systems having multiple component ids.

BACKGROUND OF THE INVENTION

In computational systems storing large amounts of data, multiple or arrays of data storage devices are commonly employed. In such systems, a storage subsystem controller (hereinafter referred to as controller) controls the transfer of data to and from a computer to the storage devices so that the computer sees all of the storage devices as being connected to the controller as one device. The storage subsystem controller and the storage devices are typically called a storage subsystem and the computer the host because the computer initiates the requests for data from the storage devices.

Commonly, the operation of the storage subsystem controller is defined by the Small Computer Systems Interface or SCSI protocol. A SCSI controller assigns a unique identifier or id to each device in the storage subsystem including itself. The id serves at least two purposes, namely the id uniquely defines each SCSI device on the SCSI bus and is used to guide the arbitration process (i.e., the process by which different devices determine which device can have control of the SCSI bus when more than one device requests access at the same time). Thus, the id determines the device's priority on the SCSI bus. Id 7, as defined by the SCSI standard, has the highest priority (and is usually assigned to the controller) and id 0 the lowest priority. On a 16-bit SCSI bus, id 15 has a priority lower than id 0 and id 8 the lowest priority. As will be appreciated, proper operation of the SCSI protocol requires that each device on the SCSI bus have a unique SCSI id. If there are any duplicate ids on the bus, the devices with duplicate ids are unable to participate in processing SCSI commands.

A multi-controller data storage system 100 is depicted in FIG. 1. Host computer 102 is in communication with two controllers, namely controller A 104 and controller B 108. Controllers A and B 104, 108 are in turn in communication with a plurality of storage devices shown as disks 112a–n. Two controllers 104, 108 are used to provide redundancy and therefore increased reliability of the storage subsystem 100. If the primary controller fails, the redundant controller manages the storage and transfer of data to and from the storage subsystem.

The primary and redundant controller 104, 108 operate in a dual controller configuration. In one dual controller configuration, both controllers 104, 108 operate in an active/passive mode in which both controllers 104, 108 are online but one controller functions as a primary controller to receive read and write requests from the host computer 102 while the other controller functions as a redundant controller (e.g., hot spare). In another configuration, both controllers 104, 108 operate in an active/active mode in which each controller is online, shares SCSI disk channels with the other controller, and functions both as a primary controller and a redundant controller. In the active/passive or active/active modes when a primary or redundant controller fails, the new controller swapped into the dual controller configuration is known as the foreign controller, and the surviving controller as the native controller.

Problems can arise, particularly for active—active controllers, when dual controllers are configured so that they have interconnected SCSI buses. Normally, each controller is assigned a hardware id (either A or B such as by an A/B switch). The hardware id determines the SCSI ids for the corresponding controller. As long as the hardware ids are different, the SCSI ids will be different. During controller installation or replacement, however, installers often fail to switch one of the controllers to a different hardware id, particularly when the controllers are physically separate and/or at different spatial locations. If a controller is generating SCSI traffic when another controller having the same hardware id (and therefore the same SCSI id) is plugged into the shared buses and powered up, disruption of I/O processing can occur, with potentially costly and severe consequences.

SUMMARY OF THE INVENTION

These and other problems are addressed by the methodology of the present invention. Generally, one of the controllers, commonly the foreign controller, monitors the communications among the various data storage subsystem components to identify one or more of the ids in use. After one or more of the ids are identified, the monitoring controller avoids the detected id's, thereby avoiding arbitration conflicts. In this manner, hardware switches or dedicated interconnections (other than buses) between system components are unnecessary, thereby simplifying system installation, repair, or servicing. The methodology is particularly applicable to SCSI storage subsystems.

In one embodiment, a method for avoiding duplicate identifiers in an array system, includes the steps of:

(a) providing first and second controllers, an array of drives and a bus subsystem interconnecting each of the first and second controllers and the array of drives;

(b) obtaining a first identifier (or id) of the first (native) controller by the second (foreign) controller using bus subsystem control signals that are transmitted between the first controller and the array of drives over the bus subsystem; and (c) avoiding an identifier (or id) of the second controller that is the same as the first identifier.

In another embodiment, a system for avoiding duplicate identifiers in an array system includes:

(a) an array of drives for storing information;

(b) a bus subsystem;

(c) a first controller electrically connected to the array of drives using the bus subsystem, the first controller being associated with a first identifier and used in generating control signals for transmission along the bus subsystem; and (d) a second controller electrically connected to the array of drives using the bus subsystem, the second controller, upon being booted, monitoring the control signals transmitted between the first controller and at least a first drive of the array of drives over the bus subsystem, the second controller determining a first identifier of the first controller using the control signals.

Id conflicts are avoided by one or more techniques. For example, the second controller can determine whether the first identifier is the same as the second identifier e.g., the default id for the foreign controller). The second controller can also determine whether an identifier of another system component, such as a disk drive, is the same as the second identifier. In either case, the second controller changes the second identifier as necessary.

The identifiers can be identified by any suitable technique. In one implementation, register support, such as a control register and a data register, is used for low level access to the bus subsystem to passively monitor control signals. In SCSI systems, the identifiers can be sampled and stored when the bus subsystem is in the selection or reselection phases. The algorithm can cycle through a predetermined number of iterations, or selection and reselection phases, to provide a high degree of reliability that all pertinent ids have been acquired. Each time through a loop, the new ids are OR'd with previously stored ids.

To ensure that the second controller has traffic to monitor, the first controller (e.g., any active, fully booted and running controller) can generate predetermined or arbitrary commands on the bus subsystem that will cause the bus subsystem to be in the selection or reselection phase. Controllers that are already booted, such as the first controller, are either processing input/output on a channel(s) or the channel (s) are idle. If any channel is idle, the already booted first controller periodically issues an arbitrary or predetermined command to one of the ids on the bus subsystem. The booting second controller can thereby detect activity on the bus subsystem within a predetermined time interval.

DETAILED DESCRIPTION

Operation of the Foreign Controller

Figure 1:
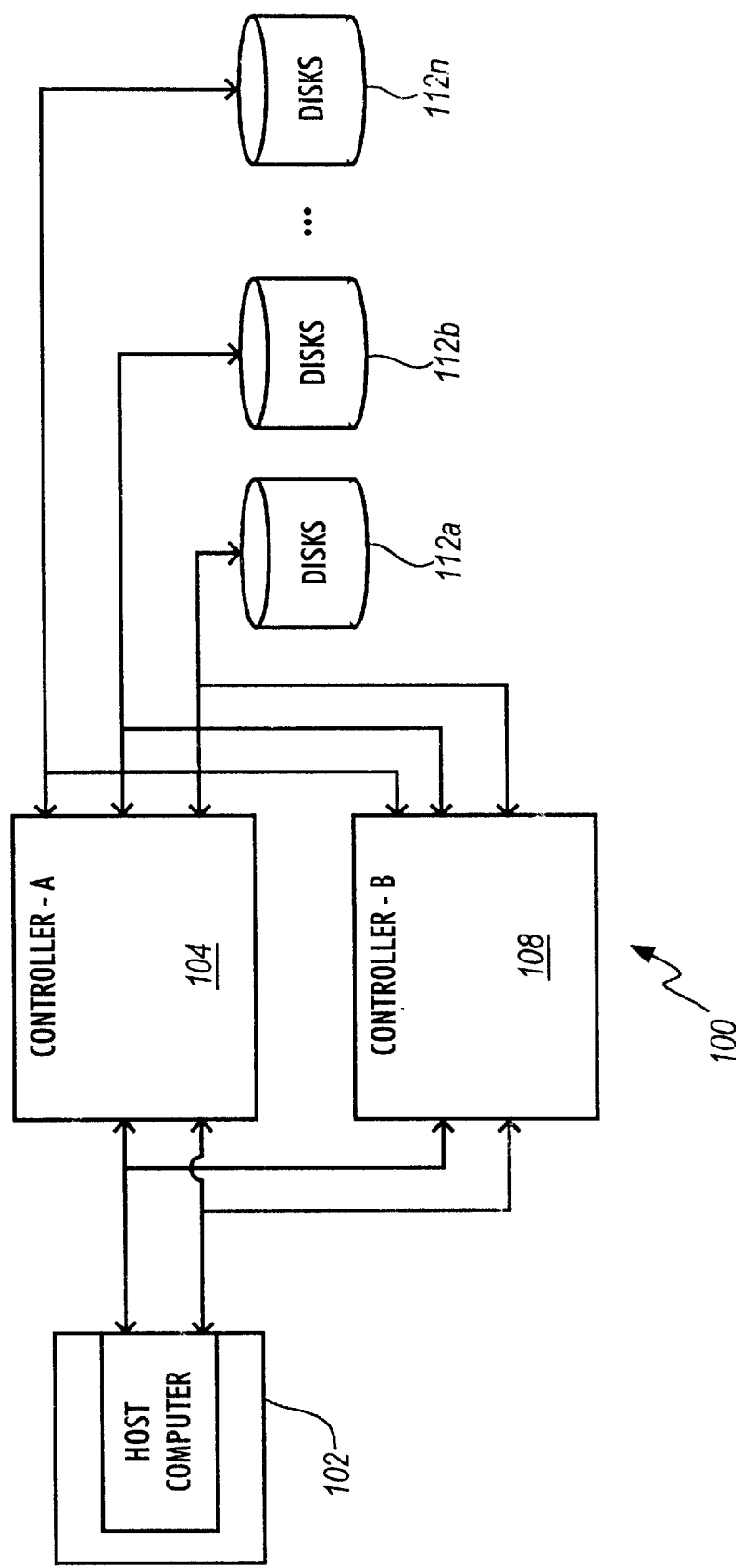
FIG. 1 is a block diagram depicting a hardware configuration according to the prior art.
Figure 2A:
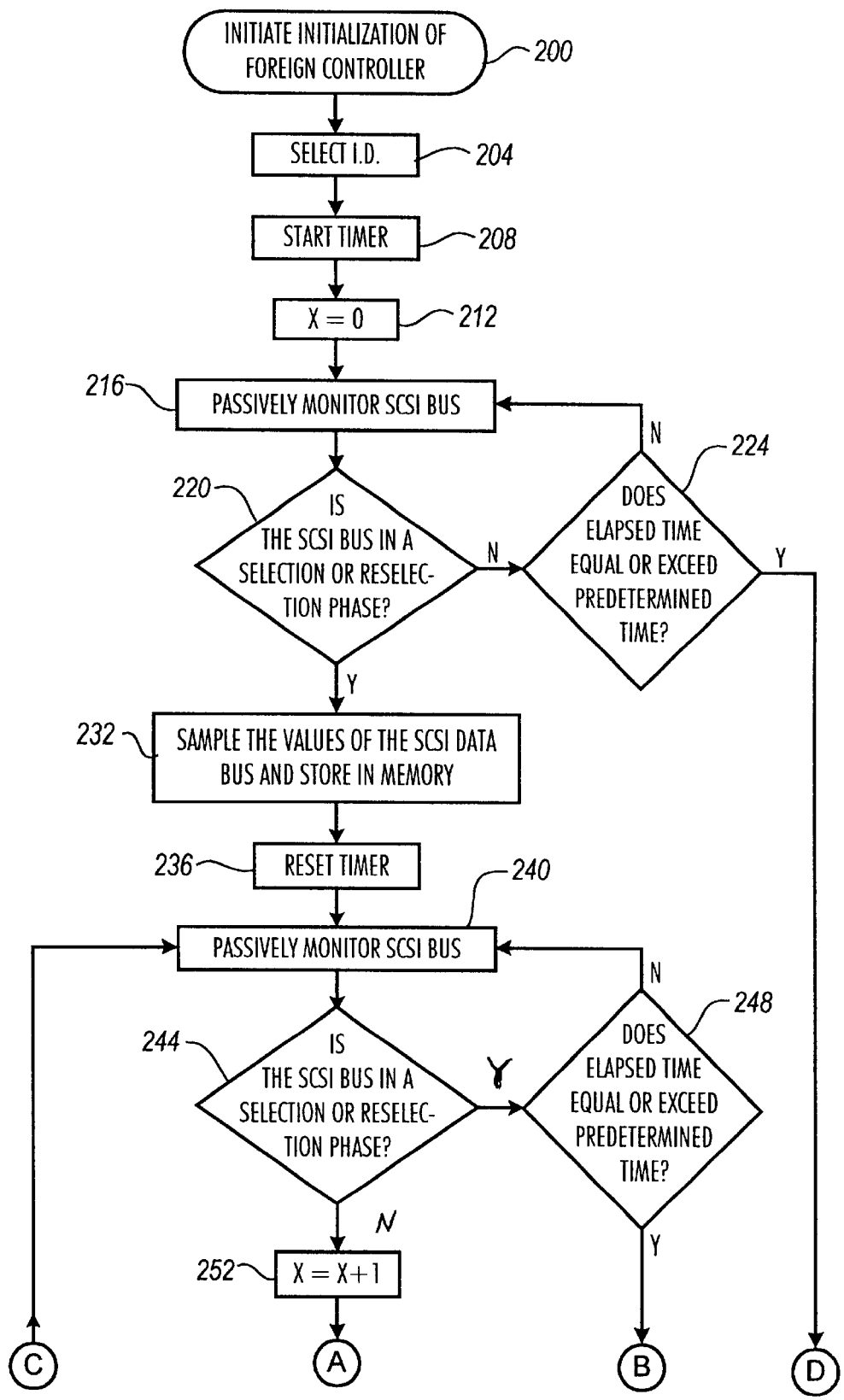
FIGS. 2A–B are flow charts depicting the operation of the foreign controller.
Figure 2B:
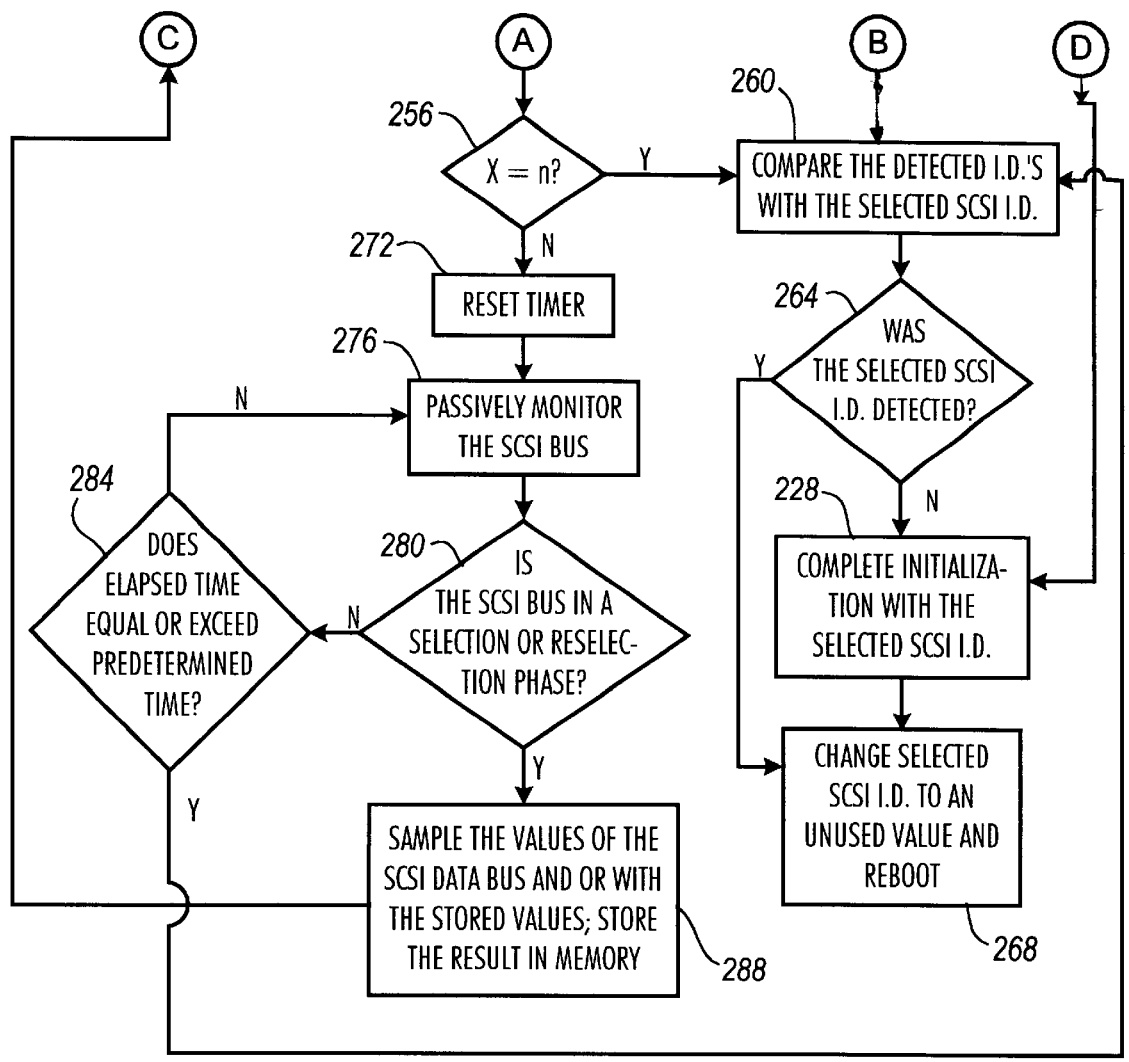

Referring to FIGS. 2A–B, the operation of the foreign controller will be discussed. The steps in FIGS. 2A–B are performed when the foreign controller is first booted after installation.

When the new or foreign controller is booted 200, the controller selects an id 204 that is defined by the SCSI protocol. A timer is started 208, and a variable X initialized or set to "0" 212. The variable or counter X tracks the number of iterations of the controller through the various passive monitoring loops while the timer determines the elapsed time during the passive monitoring step 216. Stated another way and as described in detail below, the counter X tracks the number of occurrences of a selection or reselection phase during the performance of the algorithm of FIGS. 2A–B.

The foreign controller passively monitors 216 the SCSI bus to determine if the other devices are in a selection or reselection phase. As will be appreciated, the selection phase, as defined by the SCSI protocol, occurs when an initiator forwards a command or request on the bus to another device or target, and the reselection phase when the target provides a response on the bus to the source. In either phase, the ids of the source and target device are included in the data bus signals.

In one configuration, the monitoring is performed using one or more registers or transceivers in an SCSI protocol chip and provides a program readable output of information or bits contained in the signals during transmission along the bus. In a typical application, a control register provides the bit values of the control parameters in the signal and a data register the bit values of the data in the signal. The control register(s) permit the foreign controller to ascertain current bit values or signal values on the bus. As will be appreciated by those familiar with the SCSI protocol, the values monitored in this step indicate whether the monitored bus is in the selection phase, the reselection phase, the arbitration phase, the message phase, the data phase, and the like. The only phases providing SCSI id values on the data bus are the selection and reselection phases.

When a signal passes through the control and data registers, the values in the control register corresponding to the phase are sampled. In decision diamond 220, the foreign controller determines, based on the sampled values, whether the SCSI bus is in the selection or reselection phase.

If the bus is in neither phase (but is in another phase), the controller determines 224 whether the elapsed time recorded by the timer equals and/or exceeds a predetermined time. If the elapsed time is less than the predetermined time, the controller continues to passively monitor the bus 216. If the elapsed time is equal to or more than the predetermined time, the controller id is assumed to not be in conflict and the controller completes initialization with the current (or default) SCSI id 228.

If the bus is in one of the two phases, the values in the data register corresponding to the source and target ids are immediately sampled 232 and the id values stored in memory.

The timer is reset and restarted 236, and the controller continues to passively monitor the SCSI bus 240. When a signal passes through the control register, the phase values are again sampled and the controller determines whether the bus is still in the same selection or reselection phase 244, as before. Because no additional SCSI ids will be received in the same phase, there is no need to further sample the data register in that phase.

If the same phase is still in effect, the controller again determines whether the elapsed time recorded by the timer equals and/or exceeds a predetermined time 248. If the elapsed time is less than the predetermined time, the controller continues to passively monitor the bus 240. If the elapsed time is equal to or more than the predetermined time, the other controller is stuck in the selection or reselection phase, and the controller selects a SCSI id 260 (as described below).

If the bus is no longer in the same phase, the controller increments the counter X by one 252 and determines whether X is equal to N in decision diamond 256. N is the predetermined number of iterations required for a reliable estimate of the ids of the pertinent storage subsystem components. This number is generally implementation dependent. In one implementation, the number of iterations are determined statistically such that there is a high level of confidence or high probability that all pertinent ids of the native controller and other data storage subsystem components will be recorded during the selected number of iterations. In another implementation, there may be fewer iterations than shown in FIG. 2. This is the case where, for example, ids 6 and 7 are reserved for the controllers. Simply identifying one of the ids on the bus indicates which of the values is unused.

If X is equal to N, the foreign controller next compares the detected ids with the previously selected id for the foreign controller 260.

If in decision diamond 264 the previously selected id is not one of the detected ids, the foreign controller completes initialization with the previously selected id 228.

If in decision diamond 264 the previously selected id is one of the detected ids, the foreign controller changes the previously selected id to be an unused id and the foreign controller reboots 268. If all SCSI ids are in use, the controller halts.

Returning again to decision diamond 256 if X is not equal to N, the foreign controller reinitializes and restarts the timer 272 and again passively monitors the bus for signal traffic 276. When a signal passes through the control and data registers, the foreign controller samples the control register values to determine in decision diamond 280 if the bus is in the selection or reselection phase.

If the bus is not in the selection or reselection phase, the foreign controller compares the elapsed time to the predetermined time 284. If the elapsed time equals or exceeds the predetermined time, the controller compares the detected ids with the selected SCSI id 260 and proceeds to decision diamond 264 (discussed above). If not, the controller continues to passively monitor the SCSI bus for signal traffic 276.

If the bus is in the selection or reselection phase, the controller samples the id values in the data register and OR's these values in memory 288. In other words, the values are compared to the previously recorded values and, if one or both of the values are new, the new value(s) are added to memory as additional ids along with the previously recorded ids. The controller then returns to step 240 and repeats the steps described above.

Operation of the Native Controller

Figure 3:
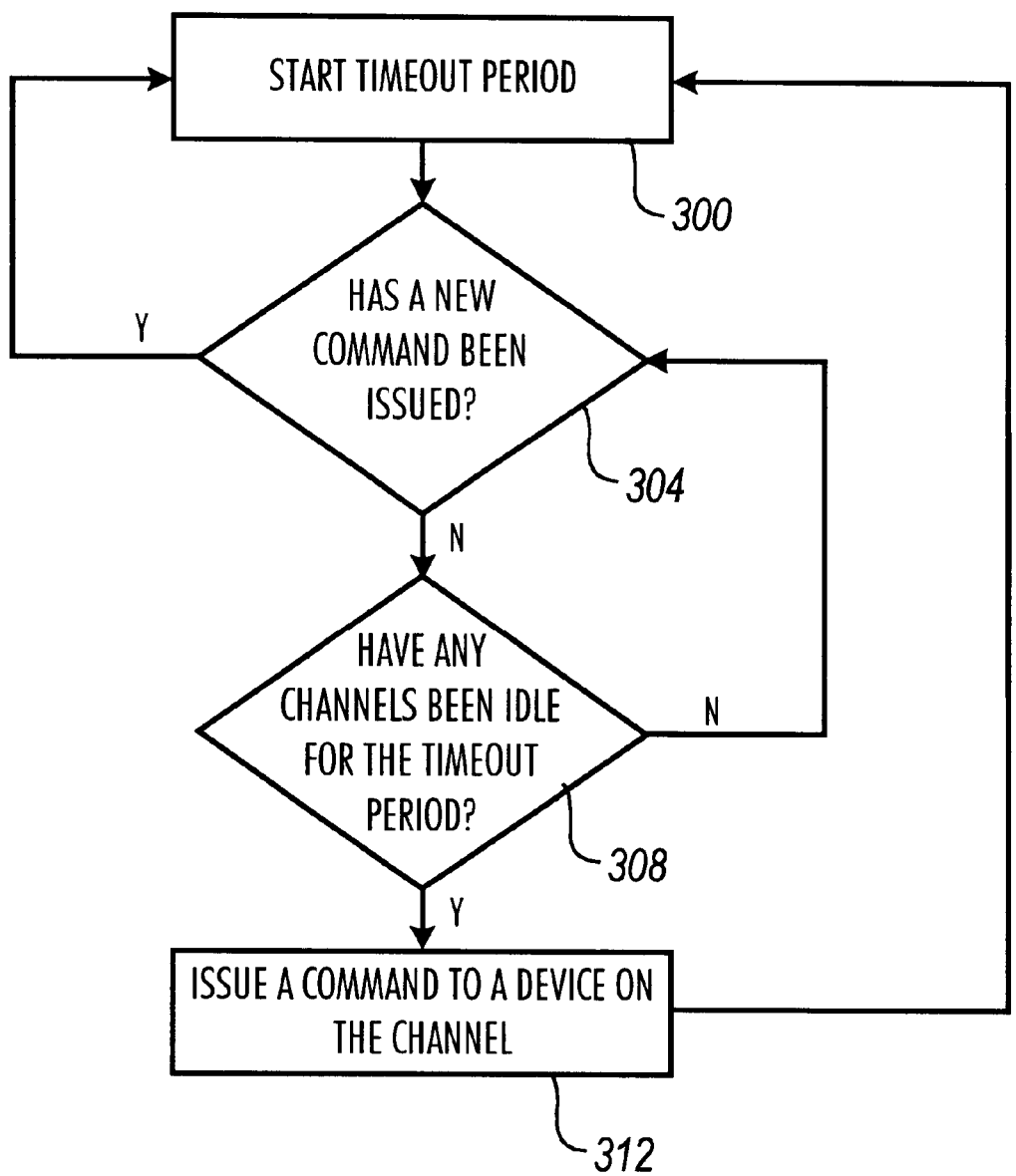
FIG. 3 is a flow chart depicting the operation of the native controller.

Referring to FIG. 3, the operation of the native controller will now be discussed. The steps in FIG. 3 are typically performed concurrently with the steps described above with reference to FIG. 2. This is so because the native controller may otherwise be idle and therefore undetected by the foreign controller during the performance of the above steps. As noted, if no selection or reselection phase is detected by the foreign controller for a predetermined time the foreign controller assumes that the previously detected id is unused and completes initialization using this id. When the native controller later enters the selection or reselection phase on the bus, conflicting ids for the controllers could result with consequent system failure.

Referring now to FIG. 3, the native controller, when booting is successfully completed, begins a timeout period 300 by initializing and starting a timer. The length of the timeout period is determined with reference to the predetermined time identified above. Preferably, the length of the timeout period is less than the predetermined time noted above.

After the timeout period is over (i.e., the duration of the timeout period has elapsed), the native controller proceeds to decision diamond 304. In decision diamond 304, the native controller determines if it has issued a new command on each channel during the timeout period. If so, the native controller returns to box 300 and restarts the timeout period. If not, the native controller proceeds to decision diamond 308 in which the native controller determines which of the channels have been idle during the entire duration of the timeout period. The native controller then issues a command to a device on each of the idle channels 312 and then returns to box 300. The command can be any suitable command that requires the bus to enter into the selection or reselection phase. The foregoing steps are preferably performed continuously by the native controller, whether or not a foreign controller has been installed. This will not cause a loss of system capacity as the native controller will perform the steps and issue dummy commands only when it is idle.

It is possible to have the foreign controller forward a signal to the native controller after initialization of the foreign controller is completed so that the native controller will terminate performance of the algorithm in FIG. 3. In the event that the foreign controller fails, the native controller could start the algorithm automatically. This allows the algorithm to be running on the native controller when the foreign controller is replaced. The foreign controller cannot complete initialization until the algorithm of FIG. 2 is successfully completed.

Both controllers will run the algorithm in FIG. 2 when they boot. If both controllers boot at the same time, each will monitor the SCSI bus, see that it is idle, and use their default ids. It is possible that both controllers have the same id. When two SCSI devices on a bus have the same id, each device will detect the other device at all SCSI id positions. This is a well-known property of SCSI buses. The controllers will make use of this property to determine if their ids are the same. If either controller detects the other controller at more than one SCSI id, it will issue a diagnostics message indicating the problem and then halt. In this situation no loss of availability to user data has occurred because both controllers were offline before the problem was detected. This can be detected when each controller sees the other controller at more than one id. Once each controller has successfully booted, each will run the algorithm in FIG. 3.

The methodology of the present invention can detect automatically controller id duplication when a controller is replaced or otherwise added in an operational data storage system or when a newly constructed data storage system is placed in operation. In the latter application, both of the controllers act as the foreign controller at boot time and as the native controller after boot completes.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. By way of example, the invention may be used with more than one controller or bus in the storage subsystem. The invention may be used with protocols other than SCSI. Any protocol or system in which component hardware or software ids are assigned to computational components may employ the above algorithm. The software may be stored in the controller chip of each controller, in shared memory, or in a protocol chip. The algorithm in FIGS. 2A and B could be automatically performed by a controller as part of the booting operation or could be user initiated. The algorithm in FIG. 3 could be performed continuously or semicontinuously or could be user initiated. One or both of decision diamonds 248 and 284 can be omitted as desired. Once another controller has been detected on a channel, the likelihood of a hung bus due to a never ending passive monitoring loop is low. One or more of the passive monitoring loops may also be omitted depending on the system implementation. The algorithm of FIG. 3 can be modified to examine only one channel rather than each channel. In that event, the controller in decision diamond 304 would determine if it has issued a command on any channel and if so would return to box 300. If not, the controller would send a command on a predetermined channel or each of the channels depending on the implementation. This alternative may create problems as the foreign controller may be unable to monitor all of the channels simultaneously in which event the foreign controller may miss activity on one of the channels if a command is issued on fewer than all of the channels. The system and methods described herein are not limited to data storage systems but can be used with any multiple component system in which multiple ids are employed. The algorithms may, in other implementations, use communication phases, modes or states other than the selection or reselection phases. The algorithm of FIGS. 2A and B may, in decision diamonds 224, 248, and 284, exit the passively monitoring loop if the elapsed time is only greater than and not equal to the predetermined time. In FIG. 3, the native controller in decision diamond 308 can consider a channel to be active if any communication has been received by or sent by the native controller if the communication includes the native controller id. The algorithm of FIGS. 2A and B may be modified, as will be obvious to one of ordinary skill in the art, to determine the ids of the drives instead of or in addition to the id of the native controller. In this alternative, the algorithm would ensure that the foreign controller id is different from the native controller id and/or the drive ids. These and other changes may be made without departing from the spirit and scope of the present invention.

What is claimed is:

1. A method for avoiding duplicate identifiers in an array system having first and second controllers, comprising:
   providing first and second controllers, an array of drives and a bus subsystem interconnecting each of said first and second controllers and said array of drives;
   obtaining a first identifier of said first controller or a drive by said second controller using bus subsystem control signals that are transmitted between said first controller and said array of drives over said bus subsystem; and
   avoiding an identifier of said second controller that is the same as said first identifier.

2. A method, as claimed in claim 1, wherein:
   said second controller has a second identifier and said avoiding step includes determining whether said first identifier is the same as said second identifier.

3. A method, as claimed in claim 2, wherein:
   said avoiding step includes changing said second identifier of said second controller when said first identifier is the same as said second identifier.

4. A method, as claimed in claim 2, wherein:
   said avoiding step includes ascertaining whether the first identifier of at least a first drive of said array of drives is the same as said second identifier and, when said identifier of said first drive is the same as said second identifier, changing said second identifier.

5. A method, as claimed in claim 1, wherein:
   said obtaining step includes utilizing register support for low level access to said bus subsystem to passively monitor said control signals on said bus subsystem.

6. A method, as claimed in claim 1, wherein:
   said obtaining step is conducted when said second controller boots.

7. A method, as claimed in claim 6, wherein:
   said obtaining step includes utilizing at least one of a selection phase and reselection phase associated with communications between said first controller and said array of drives.

8. A method, as claimed in claim 7, wherein:
   said obtaining step includes obtaining information related to said first identifier when said bus subsystem is associated with said selection phase or said reselection phase.

9. A method, as claimed in claim 8, wherein:
   said obtaining step includes obtaining identifiers including said first identifier by finding out information related to each drive of said array of drives when said first controller and said drives are communicating with each other.

10. A method, as claimed in claim 1, further including:
    iteratively checking for identifiers other than said first identifier and ascertaining whether there are any duplicate identifiers; and
    selecting another identifier for the second controller when a duplicte identifier is ascertained.

11. A method, as claimed in claim 10, wherein:
    said checking step includes looping a predetermined number of iterations during at least one of a selection phase and reselection phase associated with said bus subsystem control signals.

12. A method, as claimed in claim 1, further comprising:
    determining whether a signal has been communicated by the first controller during a timeout period;
    when a signal has not been communicated by the first controller during the timeout period, communicating a signal from the first controller to a drive in the array of drives.

13. A method, as claimed in claim 1, wherein the first and second controllers define an active—active controller pair or an active-passive controller pair.

14. An apparatus for avoiding duplicate identifiers in an array system having a controller pair, comprising:
    an array of drives for storing information;
    a bus subsystem;
    a first controller electrically connected to said array of drives using said bus subsystem, said first controller or a drive in said array of drives being associated with a first identifier and used in generating control signals for transmission along said bus subsystem; and
    a second controller electrically connected to said array of drives and to said first controller using said bus subsystem, said second controller, upon being booted, monitoring said control signals transmitted between said first controller and at least a first drive of said array of drives over said bus subsystem, said second controller determining said first identifier using said control signals and wherein said second controller has a second identifier and said second controller determines whether said second identifier is the same as said first identifier and, when said second identifier is the same as said first identifier, said second controller changes to an identifier different from said second identifier.

15. An apparatus, as claimed in claim 14, wherein:
    said second controller includes a protocol chip used in obtaining low level access to said bus subsystem in order to passively monitor said control signals.

16. An apparatus, as claimed in claim 14, wherein:
    said second controller samples states of said control signals to check for at least one of a selection phase and a reselection phase.

17. An apparatus, as claimed in claim 16, wherein:
    said second controller obtains information related to said first identifier and controls storage of said information.

18. An apparatus, as claimed in claim 17, wherein:
    said second controller stores program code that checks for an end of said selection or reselection phase.

19. An apparatus, as claimed in claim 18, wherein:
    said program code loops for a predetermined number of iterations checking for at least one of said selection phase and said reselection phase.

20. An apparatus, as claimed in claim 19, wherein:
    said program code controls storing of information related to identifiers of one or more of said drives of said array.

21. An apparatus, as claimed in claim 20, wherein:
said program code determines whether there are duplicate identifiers using said stored information.

22. A system for avoiding duplicate identifiers, comprising:
first and second controllers;
an array of drives;
a bus subsystem interconnecting each of said first and second controllers and said array of drives;
obtaining means for obtaining a first identifier of said first controller or a drive in said array of drives by said second controller using bus subsystem control signals that are transmitted between said first controller and said array of drives over said bus subsystem; and
avoiding means for avoiding an identifier of said second controller that is the same as said first identifier.

23. A system, as claimed in claim 22, wherein:
said second controller has a second identifier and said avoiding means determines whether said first identifier is the same as said second identifier.

24. A system, as claimed in claim 23, wherein:
said avoiding means changes said second identifier of said second controller when said first identifier is the same as said second identifier.

25. A system, as claimed in claim 23, wherein:
said avoiding means ascertains whether an identifier of at least a first drive of said array of drives is the same as said second identifier and, when said identifier of said first drive is the same as said second identifier, changing said second identifier.

26. A system, as claimed in claim 22, wherein:
said obtaining means uses register support for low level access to said bus subsystem to passively monitor said control signals on said bus subsystem.

27. A system, as claimed in claim 22, wherein:
said obtaining means is in operation when said first and second controllers boot.

28. A system, as claimed in claim 27, wherein:
said obtaining means utilizes at least one of a selection phase and reselection phase associated with communications between said first controller and said array of drives.

29. A system, as claimed in claim 28, wherein:
said obtaining means obtains information related to said first identifier when said bus subsystem is associated with said selection phase or said reselection phase.

30. A system, as claimed in claim 29, wherein:
said obtaining means obtains identifiers including said first identifier by finding out information related to each drive of said array of drives when said first controller and said drives are communicating with each other.

31. A system, as claimed in claim 22, further including:
checking means for iteratively checking for identifiers other than said first identifier and ascertaining whether there are any duplicate identifiers and wherein the avoiding means selects another identifier for the second controller when a duplicate identifier is ascertained.

32. A system, as claimed in claim 31, wherein:
said iteratively checking means loops a predetermined number of iterations during at least one of a selection phase and reselection phase associated with said bus subsystem control signals.

* * * * *